United States Patent [19]

Freeman

[11] 4,195,338

[45] Mar. 25, 1980

[54] COMPUTER TYPESETTING

[75] Inventor: Richard D. Freeman, Madison, N.J.

[73] Assignee: Bell Telephone Laboratories, Incorporated, Murray Hill, N.J.

[21] Appl. No.: 35,025

[22] Filed: May 6, 1970

[51] Int. Cl.[2] .......................... G06F 3/14; G03B 15/00

[52] U.S. Cl. .................................... 364/200; 364/521; 364/523; 354/5; 354/7; 340/724; 340/739; 400/304

[58] Field of Search ...................... 340/172.5, 707, 724, 340/726, 728, 731, 734, 736, 739; 364/200, 300, 900, 518-523; 354/5-7; 355/20; 400/65, 76, 304, 904

[56] References Cited

U.S. PATENT DOCUMENTS

| | | | |
|---|---|---|---|
| 3,037,192 | 5/1962 | Everett | 340/172.5 |
| 3,187,321 | 6/1965 | Kameny | 340/172.5 |
| 3,191,006 | 6/1965 | Avakian | 340/172.5 |
| 3,241,120 | 3/1966 | Amdahl | 340/172.5 |
| 3,325,786 | 6/1967 | Shashoua et al. | 340/172.5 |
| 3,389,404 | 6/1968 | Koster | 340/172.5 |
| 3,394,366 | 7/1968 | Dye | 340/172.5 |
| 3,396,377 | 8/1968 | Strout | 340/172.5 |

*Primary Examiner*—James D. Thomas
*Attorney, Agent, or Firm*—William Ryan; Robert O. Nimtz

[57] ABSTRACT

Apparatus and methods are disclosed for defining and controlling the relative positioning of symbols in a computer-based imaging system for generating images suitable for controlling a printing operation. Information describing the symbols is stored in a memory and is retrieved and the corresponding symbol relatively positioned on an imaging device in response to a control program and an input specification of the desired coincidence of "concatenation points" associated with each symbol.

10 Claims, 25 Drawing Figures

FIG. 8A $$X = \frac{\frac{1}{1+z} - 1}{\frac{1}{1-y} + 1}$$

FIG. 8B $$Z(t) = \left( \frac{\sqrt{(Y(t) - W(t))^7}}{1 + \sqrt{K(t)}} \right)^4$$

FIG. 8C $$T = \frac{1}{1+Y} \sum_{x=1}^{x=7} H'(x)$$

FIG. 8D $$\left( \frac{T_v^4 + V_t^4}{(T_v/V_t)^7} \right)^{\frac{1}{4}} = \sqrt[4]{\frac{T_v^4 + V_t^4}{(T_v/V_t)^7}}$$

FIG. 8E $$t^{z_v} + h^{z_v} = h^{z_y}$$

FIG. 8F $$Z = \frac{\left(x + \frac{1}{t}\right)^4}{\left(t + \frac{1}{x}\right)\left(\frac{1}{y} + \frac{1}{x}\right)}$$

FIG. 8G $$\frac{1}{4^4} > \frac{1}{4^{4^4}}$$

FIG. 8H $$\sqrt{7^7} < \sqrt{7^{7^7}}$$

FIG. 8I $$\frac{\partial Z}{\partial y} = \sum_{\substack{t>4 \\ t<7}} K(t) = \sum_{t>4}^{t<7} K(t)$$

FIG. 8J $$Z'(x) = \int_1^7 \hat{A}(y)\, Z(y)\, dy$$

FIG. 8K $$X = \frac{h}{k}\frac{T^4}{V^4}\frac{+1}{+1}$$

FIG. 8L $$t(y) = \frac{d(T^4)}{dv}$$

FIG. 8M $$\sum_{k=1}^{T-1}\left(\frac{tv}{kw}\right)h^{(z_y-z_v)k} = 7$$

FIG. 8N $$Z(t) = \left(\frac{1}{Y(t)+1}X(t)\right)^7$$

COMPUTER TYPESETTING

This invention relates to apparatus and methods suitable for directing automatic typesetting and display systems. More particularly this invention relates to such apparatus and methods in a system including a programmed data processor. Still more particularly, the present invention relates to data processing apparatus and methods for generating images for use in printing mathematical formulas and materials including other than linear text.

BACKGROUND AND PRIOR ART

Recent improvements in printing and typesetting technology have greatly increased the efficiency of setting type for straight linear text, e.g., newspaper text, phone directories, and the like. These improvements, which largely flow from the use of high speed data processors, include techniques for realizing such features as automatic character generation, and justification and hyphenation of linear text. Many of these features are realized in non-impact printing systems not requiring the explicit operation of typesetting. See, for example, M. V. Mathews and J. E. Miller, "Computer Editing, Typesetting, and Image Generation", *AFIPS* 1965 *FJCC Proceedings*, Vol. 27, Part 1, pp. 389–398, Spartan Books, Washington, D.C., 1965; F. Park, "The Printed Word", *International Science and Technology*, Vol. 8, No. 2, pp. 103–109, July 1965 and U.S. Pat. Nos. 3,422,419 and 3,490,004, issued Jan. 14, 1969 to M. V. Mathews et al and Jan. 13, 1970 to R. F. Ross, respectively. Nevertheless, in keeping with much common usage, the present description will proceed with the operation of character positioning characterized as "typesetting".

It is understandable that the emphasis for early efforts in computer typesetting would be in connection with the commonly-occurring, relatively simple linear textual materials. A substantial percentage of modern printing, however, is directed to areas involving the mathematical and other sciences. In these and related fields the preferred method of printed communication often requires the typesetting of a large number of mathematical and other formulas. The automation of typesetting for these more specialized mathematical and related symbols has been considerably less advanced than for linear text material.

Efforts to overcome the difficulties implicit in computer-aided printing of mathematical formulas have been in two principal directions. The first of these involves the interpretation of the formulas in a basically mathematical sense. That is, it is the mathematical and logical meaning of operations which are treated as controlling in the determination of the placing, spacing and relative positioning of the symbols involved. Thus, for example, in the system described in W. A. Martin, "Symbolic Mathematical Laboratory", Ph.D. Thesis, MIT, January, 1967, the basic internal representation of a formula is in terms of its mathematical content, and a display is generated completely automatically from this basic internal representation. The computer program automatically does such things as choose the style and size of parentheses and divide a formula in two if the formula is too long to fit on a single line. The formula division is based on the identification of the mathematical significance of the operators, e.g., a search for an equality sign is made and the position of it used to determine the point of division. Since the display program in this system is completely automatic (given the representation of the formula's mathematical content), it has no provision for the user to insert spaces where he feels they will improve the appearance of the formula or equation. Neither has it a provision for the user to select among various mathematically equivalent representations, e.g., the radical sign is not used, so that $\sqrt{}$(expression) is always represented by (expression) $^{1/2}$; multiplication is always represented explicitly, so that $A(\alpha+\beta\gamma)$ would be represented as $A\cdot(\alpha+\beta\cdot\gamma)$, and the minus sign is not used as a binary relation so that $a-b$ would be represented as $a+(-1)\cdot b$. It should be noted that the mathematical meaning of the expression is maintained, although the esthetic characteristics of the printed representation are largely not considered.

This brings us to the second area of endeavor in the computerized typesetting of mathematical formulas, namely the positioning of the mathematical symbols in an expression in accordance with their appearance, as distinguished from their mathematical significance alone. It should be understood, of course, in connection with this latter area of interest that the mathematical integrity of the expression must be maintained as well. Some examples of previous work on the problem of improving the esthetic aspects of typesetting mathematical formulas by computer will now be described.

In M. Klerer and F. Grossman "Further Advances in Two-Dimensional Input-Output by Teletype Terminals", *AFIPS* 1967 *FJCC Proceedings*, Vol. 31, pp. 675, 687, Thompson Books, Washington, D.C. 1967, for example, there are described techniques for use in connection with a project to publish a table of integrals whose accuracy has been checked by computer programs. The integral is input to the computer program by typing it in a stylized two dimensional format. The program controlled computer then modifies the spacing between symbols thereby removing excessive gaps, centering numerators and denominators and breaking a formula in half if it is too long to fit on one line.

The J. H. Kuney, et al, "Computerized Typesetting of Complex Scientific Material", *AFIPS* 1966 *FJCC Proceedings*, Vol. 29, pp. 149–156, Spartan Books, Washington, D.C., 1966, there is described a system for typesetting mathematical equations that is based on the use of macros. This system is intended to be used for typesetting mathematical equations and other materials as well, e.g., this same system can be used to typeset tabular data. Hence this prior art system does not make use of the recursive structure inherent in mathematical equations. For that reason, that system requires a considerable amount of typing to input a mathematical formula and depends much more on the judgment of the typist in determining the spacing of the symbols in a formula.

SUMMARY OF THE INVENTION

The present invention provides methods and apparatus which fall generally into the second category described above. These techniques permit the easy assembly of computer input data while at the same time providing highly efficient and flexible storage and retrieval characteristics.

Briefly stated, in accordance with one typical embodiment of the present invention, there is provided means for generating an input tape or other input representation expressing the esthetic preferences of a typesetter (within the limits of the correct mathematical interpretation). This input representation is conveniently arranged to take advantage of the recursive structure inherent in mathematical equations. This input representation is then advantageously interpreted by a programmed digital computer. In the computer, the input information is arranged and stored in a hierarchical tree structure. Further means in the form of a specially programmed processor are provided for interpreting and retrieving this stored information from memory. In this connection, a self-consistent set of so-called "concatenation points" are advantageously associated with each character or symbol to be typeset. This specially programmed processor, in accordance with a "local positional algorithm", then generates the commands necessary to generate a sequence of position signals. In particular, this algorithm is used to determine the relative positioning between a given symbol and those symbols that are "adjacent" this given symbol (as the "y" and the "+" are "adjacent" to the "X" in the expression $X^{y-2}+W$).

In effecting the positioning, the programmed computer treats the stored signal representing the symbols as abstract objects associated with respective sets of signals representing concatenation points. These objects are then selectively connected together at appropriate concatenation points to form successively larger objects. The method steps for connecting, i.e., the rules for selecting and joining the concatenation points, are completely specified by the computer program and are more completely described below. These steps include performing individually well-known computer operations such as comparison, table look-up, conditional branching and the like.

The position signals are then applied to a cathode ray tube or other display device and the resulting image photographed (or otherwise reproduced) in a now-standard manner. This photograph then serves the same purpose as photographic images generated in the prior art. That is, the photographic image is used to generate an etched plate or other more durable reproduction surface.

BRIEF DESCRIPTION OF THE DRAWINGS

Other features of the present invention will appear in the detailed description below taken in connection with the accompanying drawings wherein:

FIGS. 8A–N show typical typeset equations.

NOTATION AND NOMENCLATURE

Figure 2:
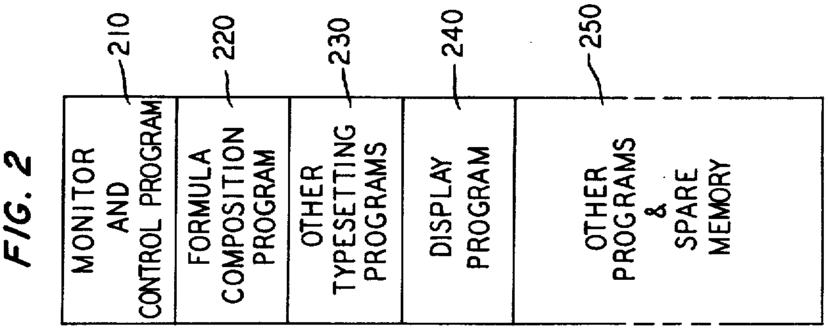
FIG. 2 shows a typical arrangement of program storage in the system of FIG. 1.

The detailed descriptions to follow are presented largely in terms of algorithms. These algorithmic descriptions are the means used by those skilled in the data processing arts to most effectively convey the substance of their work to others skilled in the data processing arts.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as samples, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose computers of the IBM 7090/94 or various of the IBM System/360 class, the GE-600 class or other similar machines. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines, including those mentioned above, may be used with programs written in accordance with the teachings herein, or it may prove more convenient to construct more specialized apparatus to perform the required method steps. The required structure for various of these machines will appear from the description given below.

DETAILED DESCRIPTION

The following detailed description will be divided into several sections. The first of these will treat a general system arrangement for generating computer typeset formulas. Subsequent sections will deal with such aspects of the present invention as structuring of input information, the generation of position—indicating signals needed to generate a visible image of formulas, typical input techniques and symbology, and typical step-by-step procedures used in typesetting using the present invention.

The limitations of readily available typewriter character fonts should be borne in mind in all typed examples given in this description. Thus, superscripts, subscripts and certain other special symbols will not always appear in this description in their optimum sizes. No such limitations are inherent in the typesetting of such material in accordance with the more general aspects of the present invention as practiced in an actual computer typesetting system.

GENERAL SYSTEM CONFIGURATION

Figure 1:
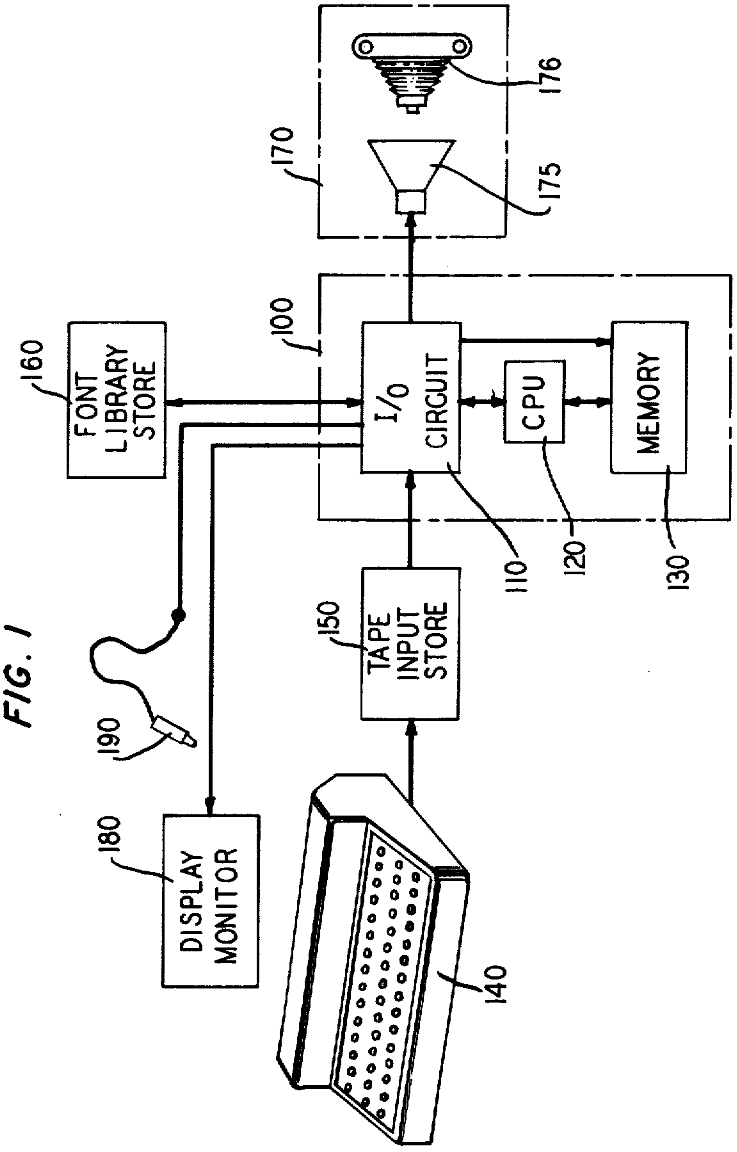
FIG. 1 illustrates a computer typesetting system incorporating the present invention.

FIG. 1 shows a typical computer-based system for generating computer typeset images according to the present invention. Shown there is a computer 100 which comprises three major components. The first of these is the input/output (I/O) circuit 110 which is used to communicate information in appropriately structured form to and from the other parts of computer 100. Also shown as part of computer 100 is the central processing unit (CPU) 120 and memory 130. These latter two elements are those typically found in most general purpose computers and almost all special purpose computers. In fact, the several elements contained within computer 100 are intended to be representative of this broad category of data processors. Particular examples of suitable data processors to fill the role of computer 100 have been given above. Other computers having like capabilities may of course be adapted in a straightforward manner to perform the several functions described below.

Also shown in FIG. 1 is an input device 140, shown in typical embodiment as a keyboard. It should be understood, however, that the input device may actually be a card reader, magnetic or paper tape reader, or other well-known input device (including, of course, another computer). Tape input store 150 is shown interposed between the input device 140 and the computer 100. It should be understood, of course, that such a tape input store (which might take the form of a magnetic or paper tape reader and storage facility of a keyboard-to-tape facility) will only be needed where compatibility between input unit 140 and computer 100 is not immediately available or desirable.

Another store shown in FIG. 1 is the font library store 160. This store, (which in appropriate cases may be incorporated in standard fashion in computer 100 as part of memory 130) is used to provide computer 100 with detailed information about the exact nature of the symbols and characters which may be selected by coded input signals, e.g., from input unit 140. The font information may be stored and accessed in any standard manner, including that described in U.S. Pat. No. 3,422,419 issued to M. V. Mathews et al on Jan. 14, 1969 as modified in the manner described below. Output unit 170 is arranged to receive position signals from computer 100 and generate therefrom a photographic or other permanent record of the desired formula image. In particular, output unit 170 may take the form of a computer microfilm printer of the type typified by the Stromberg-Carlson model 4020 microfilm printer. For present purposes, output unit 170 may be considered to comprise a display device such as a cathode ray tube (with well-known appropriate control and deflection circuitry) shown as 175, and a photographic system shown as camera 176.

Also shown in FIG. 1 is a display monitor 180 which is useful in monitoring the images being generated by the rest of the system. Such a display monitor may take the form of any of several well-known varieties of CRT displays including in particular the Digital Equipment Corporation Model 340 or Graphic-2I Display Systems. Where appropriate, the display facilities of output unit 170 and those of display monitor 180 can be suitably combined. Light pen 190 is used to indicate to computer 100 the location of information displayed on monitor 180. Thus light pen 190 may be used in standard fashion to edit (e.g., delete, modify or add to) information stored in memory 130 and/or font store 160. See, for example, U.S. Pat. No. 3,389,404 issued June 18, 1968 to R. A. Koster, or copending application by W. H. Ninke, Ser. No. 488,639, filed Sept. 20, 1969, or copending application by C. Christensen et al, Ser. No. 682,249, filed Nov. 13, 1967, now U.S. Pat. No. 3,534,338. Each of these three references is hereby incorporated in the present disclosure.

FIG. 2 shows a typical arrangement of the major programs applicable to typesetting which are stored in memory 130 shown in FIG. 1. In particular, there is shown a monitor and control program 210, which may take any of several well-known detailed forms depending upon the particular machine used to fill the roll of computer 100. In the case of the GE-635 class machine this program comprises the GECOS supervisor system described, for example, in General Electric Company reference manuals CPB-1195 and CPB-1518. Program 210 is also used for operations other than typesetting of mathematical and similar formulas. That is, this is the system monitor program well-known in each case to a computer operator that is used in almost any use of computer 100 for, among other things, compiling input programs and allocating storage areas.

A formula composition program, shown as 220 in FIG. 2 represents a sequence of instructions, which, when taken together with the various circuit elements shown in FIG. 1, the font information stored in store 160, and the monitor and control programs 210 shown in FIG. 2, forms one embodiment of the present invention. The remaining programs shown in FIG. 2 are optional in some embodiments of the present invention but are useful in other embodiments comprising more comprehensive computer typesetting systems. These programs include those designated as "Other Type-setting Programs" and identified by numeral 230, display program 240, and "Other Programs and Spare Memory" indicated by 250. The latter programs stored in spare memory 250 may include other useful computational or bookkeeping programs and may profitably be physically resident in main computer memory or a secondary memory such as an auxiliary tape unit or the like. The display control programs resident in the computers in the Koster, Ninke and Christensen et al references incorporated herein by reference may be stored (where required) in that portion designated by the numeral 240 in FIG. 2.

More detail regarding the operative programs mentioned above will be given below.

TREE STRUCTURE REPRESENTATION OF MATHEMATICAL FORMULAS

Because of their recursive nature, mathematical formulas lend themselves readily to representation by a tree structure, i.e., a hierarchical structure of nodes connected by branches. This recursive property does not exist, for example, in the relative positioning of symbols and other relations which are involved in the structural formulas for organic compounds.

Figure 3:
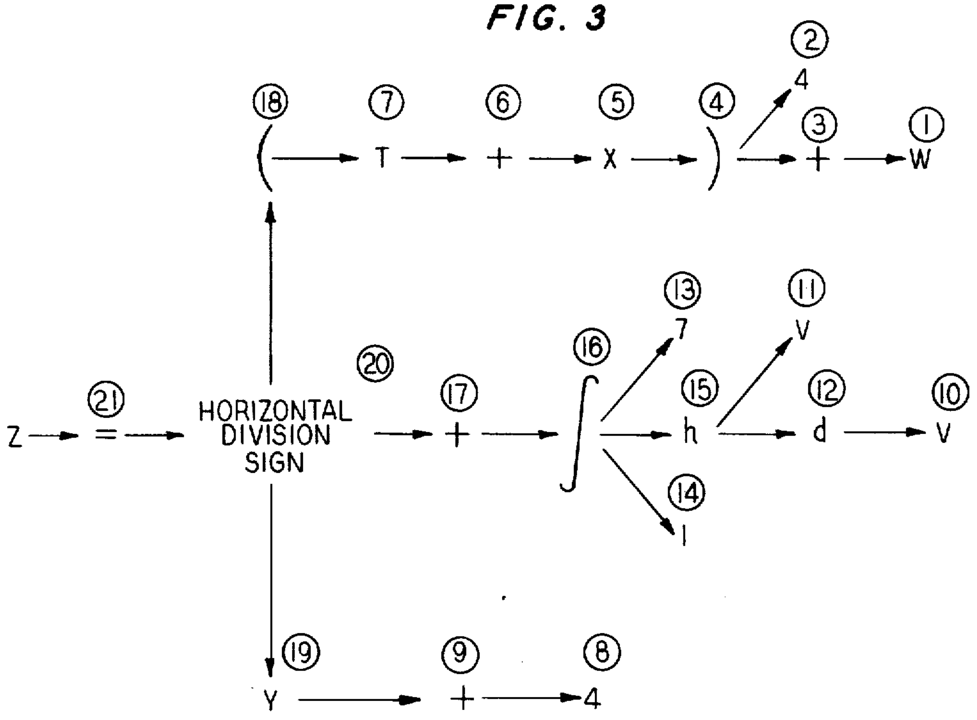
FIG. 3 illustrates the tree structure used in storing formula information in one embodiment of the present invention.

As an example of how one embodiment of the present invention uses a tree structure to represent mathematical expressions, the formula $$Z = \frac{(T + X)^4 + W}{Y + 4} + \int_1^7 h^v dv$$

is represented by the tree shown in FIG. 3. Note that the tree structure used depends on the spatial position of the symbols, not on the mathematical meaning of them or of the operators. For example, the characters falling between left and right parentheses are not treated as a unit and, in fact, a parenthesis is treated in exactly the same way as any other symbol. As illustrated in FIG. 3, the "head" (or "root") of the tree structure is the symbol at the extreme left of the main line of the formula. All symbols that are on the same line of the formula as the "head" symbol are also on the same "branch" of the tree as the "head" symbol. New branches in the tree are started by those symbols, such as exponents, initial symbols of numerators and denominators, etc., that start new lines in the formula.

The tree structure representation of the formula illustrated in FIG. 3 is used to determine the sequence in which the symbols of the formula are processed by the local positioning algorithm to be described below. In order to discuss how the tree structure representation of a formula is used in this way, there is adopted the standard list processing convention of referring to those symbols attached to a given symbol by arrows leading out from the given symbol as "subordinates" of that given symbol. Conversely, we refer to A as the "superior" of B if B is the subordinate of A. For example, in FIG. 3, the "1", the "7", and the "h" are subordinates of the integral sign and the "+" sign (shown as 17) is the superior of the integral sign. The local positioning algorithm described below takes the subordinates of a given symbol and positions them relative to that given symbol.

The circled numbers ⓝ in FIG. 3 indicate the order in which the symbols of the tree structure are processed by the local positioning algorithm and in no way form part of the formula itself. In the terminology of list processing, one would say that, in general (subject to the interpretation described below), the positioning is done in "sublist-first order".

Figure 7:
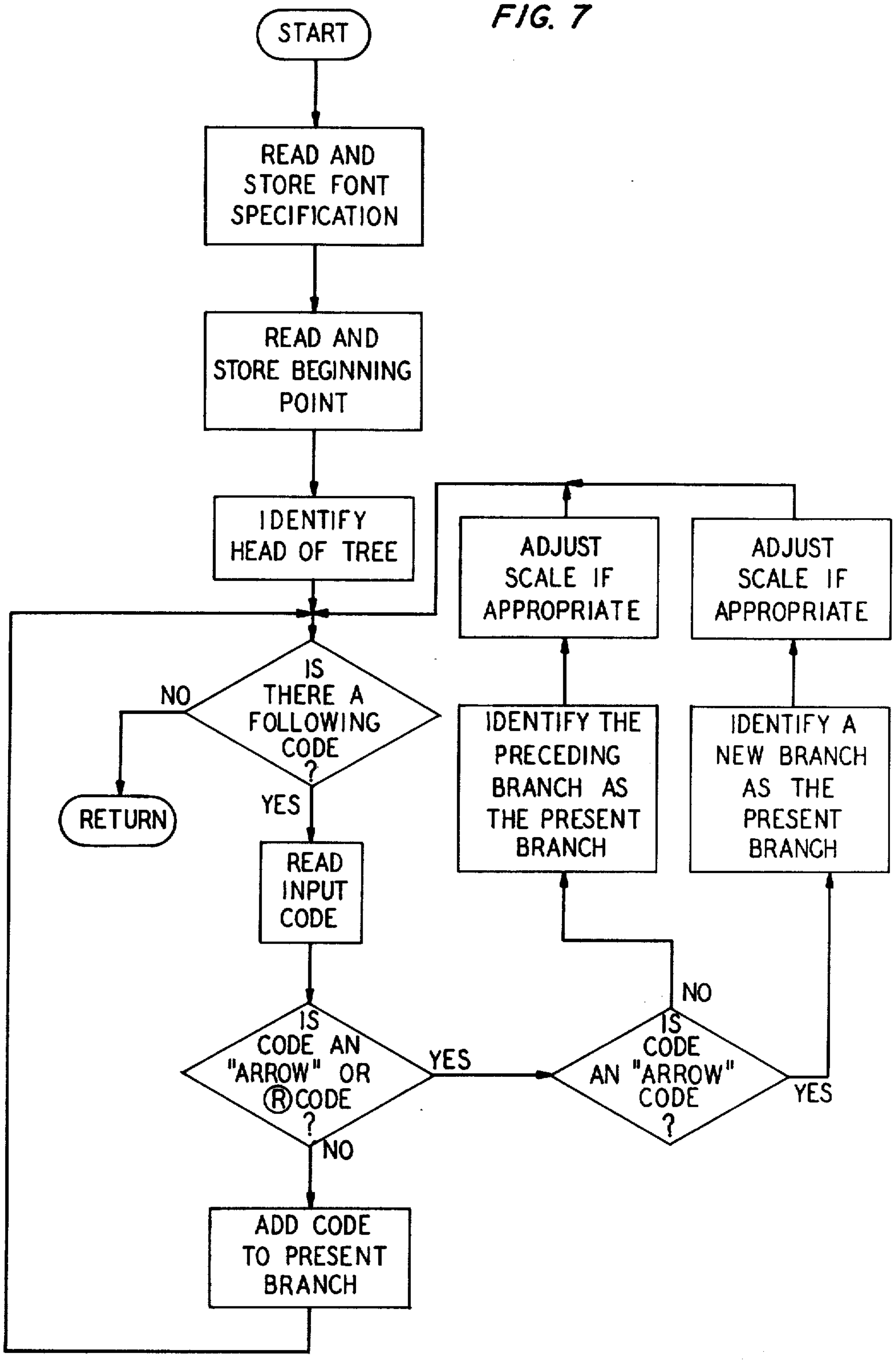
FIG. 7 is a flowchart illustrating one method for hierarchically storing input information in a tree structure.

The particular method of entering input data and establishing the hierarchical storage arrangement of it will, of course, vary with the particular computer and computer language used, but a typical and useful tree-generating and interpreting method is shown in FIG. 7 and is described in the section below entitled "Processing the Input Signals". A useful technique for entering data into computer 100 is given in the section below entitled "Input Techniques".

CONCATENATION POINTS

As mentioned above, the local positioning algorithm is used to position the subordinates of a given symbol relative to that symbol. It is usual in many prior art systems when specifying a type font to not only specify the shape of the characters, but also to identify with each character a rectangular area called a "matrix". The widths of these rectangular matrices are in general different for different letters and symbols of the alphabet. When a line of text is typed on a Linotype machine, for example, the matrices corresponding to the letters within a given word are placed side by side and physical wedges are placed in the spaces between words. The wedges are used to justify the text so that the right margin comes out even. To justify a line of text, the wedges are pushed down until the line extends to the right margin. Since the letters within a given word are concatenated by placing the corresponding matrices side-by-side, the spacing between letters is determined in these prior art systems by the widths of the rectangular matrices and the positions of the character images on these matrices.

Figure 4:
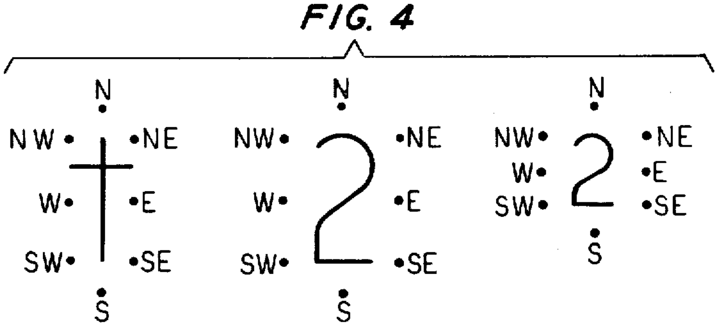
FIG. 4 illustrates the concept of concatenation points in connection with typical mathematical formula symbols.

In accordance with one embodiment of the present invention, the straightforward edge-to-edge concatenation used in a Linotype machine is replaced by a technique involving the assignment of a set of "concatenation points" to each character. These concatenation points are conveniently arranged to correspond roughly to the eight major compass directions (N, NE, E, SE, S, SW, W, NW). This arrangement is illustrated in FIG. 4 for the symbols "t", "2", and "small 2" (for use in superscripts and subscripts). The positioning procedure utilizing these concatenation points is best illustrated by example.

Figures 5A, 5B, 5C:
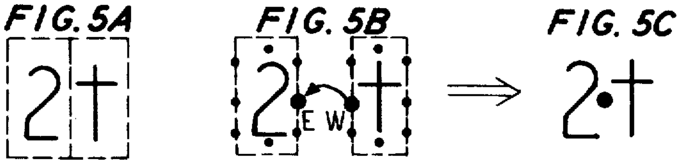
FIGS. 5A–C illustrate the process of concatenating successive symbols along a line.

In forming "2t", one desires that the "t" be positioned directly to the right (i.e., east) of the "2", just as if they had been positioned in a Linotype machine by concatenating their rectangular matrices edge-to-edge as shown on FIG. 5A. To understand how the same result is realized when using the concatenation points to do the positioning, it is convenient to first envision that the east concatenation point of the "2" lies on the east edge of its (nonexistent) "matrix" and the west concatenation point of the "t" lies on the west edge of its (equally nonexistent) "matrix". This is illustrated in FIG. 5B. "2t" is then formed in accordance with the principles of this embodiment of the present invention by positioning the "t" such that the west concatenation point (shown enlarged for emphasis) coincides with the east concatenation point of the "2" (also shown enlarged) as illustrated in FIGS. 5B and 5C. It should be understood of course that the concept of a "matrix" is no longer essential to the typesetting of characters using the present invention; the location of the concatenation points of a character contains all the necessary information previously contained in the geometrical information required to specify a matrix. Further, the concatenation points permit a much more general and flexible positioning of adjacent symbols.

Figures 6A, 6B, 6C:
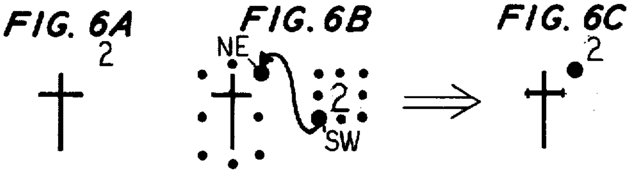
FIGS. 6A–C illustrate the process of concatenating successive symbols one of which bears an exponential relation to the other.

One advantage of basing the local positioning algorithm on the use of "concatenation points" is that the same positioning technique that is used for straight linear text can also be applied to superscripts, subscripts, division signs, integral signs, etc. For example, to form "$t^2$" as shown in FIG. 6A, one positions the "small 2" such that its southwest concatenation point (shown enlarged) coincides with the (enlarged) northeast concatenation point of the "t" as shown in FIGS. 6B and C.

The flexibility afforded by the use of "concatenation points" as described herein provides an important advantage over the earlier techniques described, for example, in the Martin reference, supra. In this earlier work, the programmed computer enclosed each character and each set of characters, e.g., "$A_2$", "$(x+y)^2$", in an imaginary rectangle. The positioning of the characters in a mathematical expression is then accomplished by positioning these rectangles with respect to each other, without regard for the detailed nature of the symbols in the rectangles.

As an example of the advantages, which accrue through the use of concatenation points, consider the expression $U_A+V_B2+W_{C2}$. Using the concatenation point technique of one embodiment of the present invention, the subscripts A, $B^2$, and $C_2$ would all be placed in the same position relative to their "superior" symbols, U, V, and W, respectively. Specifically, the subscript characters A, B, and C would each be at the same vertical position relative to the main line of the text.

However, since the superscript "2" extends above the top of "B" in "$B^2$", and the subscript "2" extends below the bottom of the "C" in "$C_2$", positioning the symbols within the expression $U_A+V_B2+W_{C2}$ by the "enclosed rectangle technique" used earlier work would not result in the subscript characters "A", "B", "C" all having the same vertical position relative to the main line of the text. The results of such an "enclosed rectangle technique" positioning algorithm are readable, but the resulting irregularity does not satisfy the aesthetic requirements of publication quality typesetting. Nor does it provide the flexibility provided by the apparatus and methods associated with concatenation points and described herein.

LOCAL POSITIONING ALGORITHM

Except for some refinements discussed below, the basic local positioning algorithm using concatenation points to typeset mathemetical formulas stored in a hierarchical tree structure may be stated as follows:

(1) Cause an appropriate (specified) concatenation point for subordinates of a given symbol to coincide with appropriate (specified) concatenation points for that given symbol. The means for specifying the appropriate concatenation points will be treated below.

(2) The order of symbol processing is as follows:

(a) Along a given branch of the tree, positioning starts at the right-hand end and works back to the left. It should be understood that right and left refer to the structure as shown in FIG. 3 (head at the left). It may be convenient to represent and/or store the structure in a vertical arrangement with the "head" at the top or bottom. In all cases, however, the order of positioning will proceed in a given branch in a direction toward the head of the structure.

(b) If a given symbol along a given branch has subordinate symbols that start new branches, all of these new branches are positioned internally (with respect to the given symbol) before any positioning is performed on the given symbol of the given branch. For example, in FIG. 3, the symbols in the branch started by the left parenthesis "(" that is a subordinate of the horizontal division sign are positioned relative to each other before the local positioning algorithm is applied to any of the symbols on the main (division sign) branch.

The "appropriate" concatenation points are determined by the character or symbols involved, as well as the significance, e.g., superscript or subscript, as stated by the user input. The technique used to cause designated concatenation points to "coincide" is to merely specify that they be located at the same point when their associated symbols are displayed on the CRT 175 or other output device. Since the concatenation points occupy a fixed position relative to their associated characters, these characters will necessarily bear the correct spatial relation to each other. The concatenation points are not themselves normally displayed.

It proves convenient in some cases to associate symbols which have been relatively positioned (by causing respective concatenation points to coincide) together to form a composite symbol having concatenation points defined by the extremum concatenation points, in each compass direction, of the original symbols.

STORAGE FORMATS

The exact character size and shape and the location of the concatenation points are conveniently stored in font library store 160 in FIG. 1 and are transferred to memory 130 (or directly to display device 170) as required for a particular job.

Information stored in the font memory 160 shown in FIG. 1 typically includes a coded representation of a symbol sufficient to select the required character form, e.g., a matrix or other selection arrangement in a character or symbol generator of any standard design associated with computer 100 or output unit 170 in FIG. 1. This character generator may be of any standard form, including one wherein the output device is a CRT having an apertured plate between the source of the electron beam and the target phosphor. The selection process responsive to the coded representation then involves controlling the electron beam to pass through the specified aperture and thereby be shaped to the desired symbol cross-section. Alternately, the required deflection signals are arranged to be in the correct order and format for the above-mentioned Stromberg-Carlson Model 4020 or similar device.

Other information stored in font memory 160 includes that which specifies the position of the concatenation points for each character. In a system including a device requiring only a code to select a symbol, this is conveniently specified as the x and y coordinate distances for each concatenation point (in multiples of some fundamental unit of distance) measured from the center (or other reference point). The unit distance need be specified only once for each symbol set. Thus, the information for a given character set may take the form (Name of type font)
(Unit of distance)
(Miscellaneous data related to particular font)
•
•
•
(Code for first symbol)
(x and y distances for east concatenation point)
(x and y distances for northeast concatenation point)
•
•
•
(x and y distances for southeast concatenation point)
(Code for second symbol)
(x and y distances for east concatenation point)
•
•
•
(Code for third symbol)
•
•
•

(x and y distances for southeast concatenation point). The miscellaneous data typically includes the point (center point or other) to be used as a reference from which to measure distances.

INPUT TECHNIQUES

In a system of the type shown in FIG. 1 and described above the user typically inputs (enters) the mathematical expressions to be typeset by the system by means of an ordinary teletypewriter or similar device. According to a useful convention associated with the present invention, some of the standard teletypewriter character codes are used for representing directions, e.g., N, NE, etc., and others are used for other control characters. For example, " ↗ " is used to represent the character code for northeast, and "t ↗ 2" represents $t^2$. To simplify the discussion, it is assumed that the directions N, NE, SE, S, SW, and NW are represented by the characters symbolized by ↑, ↗, ↘, ↓, ↙, ↖, and, respectively, although any other convention can be adopted if desired.

Note that there is no symbol for concatenation to the east; this omission is possible because the present invention, in the above described embodiment, employs the convention that if no concatenation direction is indicated, the next symbol is concatenated to the east of the last symbol. Thus, to specify straight linear text such as (A+B)/y, the user of the system simply types the appropriate characters, one after another, as he would with an ordinary typewriter. There is ordinarily no symbol indicating concatenation to the west because the user is not ordinarily permitted this option. This is so because to allow the user to specify that a new symbol is to be concatenated to the west (i.e., left) of a given symbol would greatly complicate the programming without adding anything of significance to the system. In addition to the six direction characters, a seventh character, denoted Ⓡ, is used to return processing control from the last sub-branch that was defined. For example, the formula $W^{2v}+X$ would be input as W 2v Ⓡ +X. If the " Ⓡ " had been left out, the formula would have been typeset as $W^{2v+X}$ instead of $W^{2v}+X$.

It has been found that a previously inexperienced user is able to rapidly adjust to the input language used in this embodiment of the present invention. As one gains even slight familiarity with the way the system uses a tree structure to represent a mathematical formula, it becomes very easy to write input sequence required to specify a desired mathematical expression—much easier, in fact, than to type the same mathematical expression using an ordinary typewriter. Using the conventions described above, the expression $$Z = \int_{h^v dv}^{7}$$

would be represented as Zb̸=b̸ 7R 1Rh vRdv, where b̸ represents the character corresponding to a space in the mathematical expression. Additional spaces can of course be inserted to improve the appearance of the final typeset product.

The number of distinct character codes available on a teletypewriter or similar device is usually insufficient to allow one to represent by a unique character code all the symbols that occur in mathematical typesetting. Hence, the input language for one embodiment of the present invention conveniently makes provision for the set of all available letters and symbols to be broken up into several "cases" (just as there is an upper case and a lower case on a typewriter). Thus, the same character code (except for case) is used to represent different symbols in the different cases, just as the keys on a typewriter represent different—and not necessarily related"characters in upper and lower case. Different cases are readily specified by preceding each character code by one of several seldom-used character codes, e.g., the ampersand, &.

The present invention also provides two other features which provide the user with additional control over the precise appearance of the printed mathematical expressions. The first such feature allows the user to increase or decrease the type size in which symbols are printed when the user is unsatisfied with type size determined by the procedure described below. This is accomplished under program control in one embodiment by modifying or interpreting (by the addition or subtraction of a specified quantity) the original font size specification for the selected symbols. The second additional feature allows the user to adjust the position of any individual character in the horizontal and/or vertical directions. The user does this by inputting a control character followed by the distance (defined in a suitable scale) that the character is to be moved. Alternately, symbols can be moved under the control of light pen 190 in the manner described, e.g., in the Christensen et al reference, supra.

PROCESSING THE INPUT SIGNALS

The input text, representing, e.g., a mathematical formula, is processed by computer 100 in three steps. The first step is to read the input codes and build the tree structure representing the formula. This process is illustrated in the flow chart of FIG. 7. During this structuring step, the system advantageously automatically adjusts the size of characters used in superscripts and subscripts according to a predetermined scheme. This is desirable because in most published material, excluding typewritten manuscripts, superscripts, subscripts, exponents and the like are printed in a smaller type size. To save the user the trouble of having to indicate this size change, the formula composition program operating within the computer automatically adjusts symbol size specifications to the next lower size whenever a new sub-branch is started. The program maintains a list of exceptions, e.g., numerators and denominators of division signs, where the size remains unchanged.

While most of the details of FIG. 7 are self explanatory, a few words about the terminology used there may be appropriate. It is understood that the user in entering the input data stream will ordinarily specify the particular font, symbol size and beginning point for the formula or other text to be compared. A useful convention is to adopt a standard, or default, condition for each of these parameters which are assumed unless specific provision is made for another condition.

The head of the tree is merely the first element in the main branch of the tree. A scan of the input is then made to see if another input code is present. If there is and it is not a change of branch code, it is entered in the present branch. It is convenient to consecutively number new branches as they are formed in response to an arrow ( ↗, ↑, etc.) or equivalent code. The numbering of branches facilitates the structuring and subsequent application of the local positioning algorithm. As is clear from FIG. 7, then, each input code is read and each code which does not indicate a branch change is assigned to a list corresponding to the then-current (present) branch.

The second step in processing the input is the actual composition of the signals specifying the relative positioning of the symbols in the mathematical formula. This consists of applying the local positioning algorithm illustrated in FIG. 3 and described above to the nodes of the tree structure in a sublist first order as illustrated by the circled numbers ⓝ in FIG. 3. Finally, the third processing step is to generate an image of the positioned formula on the CRT of microfilm plotter or similar image producing output apparatus identified as 170 in FIG. 1.

The computer 100, operating under the control of the programs including a coding of the local positioning algorithm described herein, conveniently determines the location of the center point (or other reference point) for a given symbol on the display surface (CRT or other device) used in output unit 170. Thus, knowing the positions of the selected concatenation points (those to be superimposed) and the position of the center point for one character, the calculation of the center (or other reference) point for all symbols is immediate. The sequence of signals indicating the desired position of the center point and the code designation for each desired symbol is usually all that is required by the output device.

EXTENSIONS OF THE LOCAL POSITIONING ALGORITHM

The above discussion describes the basic procedure used by the local positioning algorithm. There are, however, several modifications that are useful in dealing with some of the constraints that are typically encountered in typesetting mathematical equations. A first modification is useful in keeping subscripts and superscripts of a given character from overlapping with the next character to the right. Consider, for example, the formula whose tree structure is illustrated in FIG. 3. The spacing that is desired between the "h" and the "d" in $$\int_1^7 h^v dv$$

is larger than would be desired if the "v" were not present as a superscript on the "h". The method by which the local positioning algorithm deals with this is to take any subordinate symbol that is concatenated to the east of a given symbol (as the "d" is to the east of the "h") and delay its positioning until all other subordinates of that given symbol have been positioned. Thus in the example of FIG. 3, the "v" would already have been positioned relative to the "h" to form "$h^v$" before the local positioning algorithm determines the spacing between the "h" and the "d". The local positioning algorithm thus increases the spacing between the "d" and the "h" enough to compensate for the presence of the "v" as a superscript on the "h".

A slight variant of this situation is illustrated by the formula $\beta_{2W} = X_\alpha + 3$ in which the expression "$\beta_2$" serves as a superscript of the symbol "W". Just as in the previous example of "$h^v dv$", the horizontal spacing between the "$\beta$" and the "W" has to be increased because of the presence of the "2". The only difference is that in this case the "2" is associated with the subordinate symbol, namely the "$\beta$", rather than the superior symbol. Since the tree structure representing a formula is processed in "sublist-first order", the "2" will have been positioned relative to the "$\beta$" to form "$\beta_2$" before the local positioning algorithm must determine the spacing between the "$\beta$" and the "W". Since the size of the "2" determines the size of the composite character "$\beta_2$" (as well as the location of the concatenation points for "$\beta_2$") just enough extra spacing is between the "$\beta$" and the "W" to exactly compensate for the presence of the "2". This extra spacing is automatically and uniformly specified under the control of computer 100 without the use of mechanical or other wedges.

A second modification to the basic local positioning algorithm is useful in treating the case where a superscript concatenated to the northeast of a given symbol would overlap, or nearly overlap, with a subscript to the southeast, as, for example, in $$Z = X + W_y^\beta .$$

The program controlled computer checks each superscript concatenated to the northeast to see if it would almost overlap with a subscript to the southeast. A suitable minimum desirable distance is specified or, by default, assumed for this purpose. When such an overlapping superscript is found, it is moved horizontally past the right-hand end of the subscript, so that, for example, the last equation would become $$Z = X + W_y{}^\beta .$$

A third modification is useful when dealing with the positioning of numerators and denominators of horizontal division signs. The numerator of a horizontal division sign is of course concatenated to the north of the division sign and the denominator is concatenated to the south. Consider, for example the two expressions "$1/\alpha+\beta$" and "$\mathring{\alpha}$". In the expression "$\mathring{\alpha}$", the vertical distance between the "$\alpha$" and the "$^o$" should be small. However, if a larger spacing between the "$\alpha$" and the horizontal division sign in "$1/\alpha+\beta$" were not provided, the result would be that the $\beta$ would overlap the horizontal division sign.

The basic difference between these two cases is that in positioning the "$^o$" to form "$\mathring{\alpha}$", one desires the north concatenation point of the "$\alpha$" to represent the top of the physical image of the character "$\alpha$". But in positioning the expression "$\alpha+\beta$" below the horizontal division sign, one desires the north concatenation point of the "$\alpha$" to represent the top of the line of text containing the "$\alpha$", not just the top of the character "$\alpha$". This problem is solved by defining two new concatenation points, "top-of-text" and "bottom-of-text" concatenation points, in addition to the eight concatenation points described earlier. Referring to the tree structure illustrated in FIG. 3, the top-of-text concatenation point is used in place of the north concatenation point if the character in question (such as the "$\alpha$" in the denominator of "$1/\alpha+\beta$") is a subordinate symbol that is being positioned relative to a superior symbol (as the "$\alpha$" in "$\alpha+\beta$" is a subordinate symbol being positioned relative to its superior symbol, the horizontal division sign). The standard north concatenation point continues to be used when the character in question (such as the "$\alpha$" in "$\mathring{\alpha}$") is a superior symbol relative to which one is now positioning a subordinate symbol. For example, the "$\alpha$" in "$\mathring{\alpha}$" is a superior symbol relative to which we are positioning the subordinate symbol "o". A similar rule holds for the bottom-of-text concatenation point.

Even with use of top-of-text and bottom-of-text concatenation points, it still would be possible for a numerator or denominator to extend far enough in the vertical dimension as to intersect, or almost intersect, the horizontal division sign. The program checks for this and adjusts the vertical position of a numerator or denominator to correct this if it would otherwise occur. A similar check is made on expressions under a radical (square root) sign. Typical situations where this might occur, and where adjustments are required are illustrated by the expressions $$\frac{1}{4^{44}} \text{ and } \sqrt{7^{77}}\,.$$

In addition to checking the spacing between numerators and denominators and their associated horizontal division signs, the program will also center the numerators and denominators in the horizontal dimension.

Lines of text above or below a summation sign, Σ, or a product sign, Π, are treated in a manner analogous to numerators and denominators. The main difference is that it is possible to have more than one line of text above or below a summation or product sign. These features are illustrated by the expression $$\sum_{\substack{t>4\\t<7}} K(t) = \sum_{t>4}^{t<7} K(t).$$

Other refinements of the basic processing techniques described above are also useful. For example, there is provision for underlining or overscoring text. The user must indicate whether he wants underlining or overscoring and must insert into the input character stream (described above) an indication of the start and end of the test to be underlined or overscored.

In the various basic features of the present invention and the various extensions thereto, the programmed operation of comparing (as for overlap) is clearly implicit. This operation is expecially well adapted to performance within a general purpose computer of the type herein envisioned having also stored therein all of the coordinate, font size and related spatial information.

Typical results of computer typesetting using the present invention are shown enlarged in FIGS. 8A-N. While a relatively primitive type font has been employed in these examples, it should be understood that no such limitation is essential to the present invention.

CODING DETAILS

No particular programming language has been indicated for carrying out the various control procedures described above. This is in part due to the fact that not all languages that might be mentioned are universally available. Each user of a particular computer will be aware of which language with which he is acquainted is most suitable for his immediate purposes.

One well-known language that has proven useful in FORTRAN. Because the computers, and monitor systems used therein, that may be used in practicing the instant invention are manifold, however, no detailed program listings have been provided. It is considered that the algorithms and other procedures described above and illustrated in the accompanying drawing are sufficiently disclosed to permit one of ordinary skill to practice the instant invention or so much of it as is of use to him.

Numerous and varied modifications and extensions of the above-described system within the spirit and scope of the present invention will occur to those skilled in the art. It is clear, for example, that the symbols to be positioned or "typeset" need not be mathematical symbols but can include, in whole or part, linear test, chemical equations, musical scores, in fact, any visually observable graphic representation susceptible to storage in a tree structured form as described above. The present techniques and apparatus are readily generalized to three dimensional representations by specifying and operating on concatenation points for each of the three coordinate directions. When various requirements dictate, such as objects having circular or other symmetry, the directions of the concatenation points may be chosen in other than the compass point directions (or approximations thereto). Further, the number or location of concatenation points may be chosen for convenience and flexibility in a particular application. It is clear also that various output devices may be substituted for the CRT shown as 175 in FIG. 1.

What is claimed is:

1. In a computer display system comprising (A) a display device for generating relatively-positioned symbol images in response to applied sequences of signals specifying the shape and position of said images, (B) a data processor comprising (1) means for storing a first plurality of data sequences, each describing individual symbols, and a second plurality of data sequences corresponding to a control program, (2) means responsive to said control program for nondestructively reading from said means for storing and transferring to said display device selected ones of said first plurality of data sequences, (3) means responsive to said control program for generating and transferring to said display device data sequences specifying the desired position of at least a first one of said selected data sequences, the improvement comprising means for storing additional information specifying spatial coordinate positions, relative to a reference point on a corresponding symbol, of a plurality of concatenation points associated with said corresponding symbol, and means responsive to said control program for generating and transferring to said display device data signals specifying the coincidence of at least one specified concatenation point of a given symbol with specified concatenation points on adjacent symbols.

2. The system of claim 1 further comprising input means for modifying said control program by providing input data specifying the desired positioning of said images.

3. The system of claim 2 further comprising means for storing said input data in a hierarchical tree structure, the lowest level branch of said structure corresponding to the position of the symbol described by said first one of said selected data sequences, successively higher branches of said structure indicating the position of corresponding symbols relative to the position of the symbol described by said first one of said selected data sequences.

4. The system of claim 3 further comprising editing means responsive to the images generated by said display device and to said control program for modifying the relative position of selected ones of said images.

5. The system of claim 3 wherein said editing means comprises a light sensitive device for generating signals indicating desired image positions and program controlled means for modifying said data signals specifying the coincidence of concatenation points.

6. A display system comprising (A) a display device responsive to applied information signals for generating images, (B) means for storing display information corresponding to a plurality of display entities, said display information comprising entity identification information and information identifying the position of a plurality of concatenation points corresponding to each of said display entities, (C) programmed controlled means for generating position signals specifying the relative position of selected ones of said display entities by specifying the coincidence of at least one of the concatenation points associated with one of said selected ones of said display entities with appropriate concatenation points associated with adjacent ones of said selected display entities, and (D) means for applying entity-identification signals and associated position signals to said display device.

7. The system of claim 6 further comprising means responsive to said entity identification signals and said position signals corresponding to said adjacent ones of said selected display entities for testing for lack of a minimum clearance between said selected display entities, and means responsive to said means for testing to modify said position signals when said lack of minimum clearance appears.

8. In a computer display system comprising (A) a display device for generating relatively-positioned symbol images in response to applied sequences of signals specifying the shape and position of said images, (B) a data processor comprising (1) means for storing a first plurality of data sequences, each describing individual symbols, and a second plurality of data sequences corresponding to a control program, (2) means responsive to said control program for nondestructively reading from said means for storing and transferring to said display device selected ones of said first plurality of data sequences, (3) control means comprising means responsive to said control program for generating and transferring to said display device data sequences specifying the desired position of symbols corresponding to said selected data sequences, the method of controlling said system comprising the steps of (A) generating data sequences corresponding to concatenation points associated with each of said symbol images, and (B) generating data sequences specifying that selected ones of said concatenation points associated with desirably adjacent symbol images should occupy identical spatial positions.

9. The method of claim 8 further comprising the steps of (A) testing said data sequences specifying the position of said desirably adjacent symbol images for lack of a minimum clearance therebetween, and (B) modifying said data sequences corresponding to at least one of said concatenation points associated with said desirably adjacent symbol images.

10. The method of claim 8 further comprising the steps of (A) generating a sequence of input signals representing the desired position of said selected ones of said individual symbols (B) generating hierarchically structured signals representing the branches of a tree structure corresponding to the relative position of said selected ones of said individual symbols, higher order signals corresponding to the position of symbols subordinate to symbols represented by lower order symbols (C) operating sequentially on said hierarchically structured signals to generate said data sequences specifying the desired position of said selected ones of said individual symbols.

* * * * *